United States Patent Office
2,823,697
Patented Feb. 18, 1958

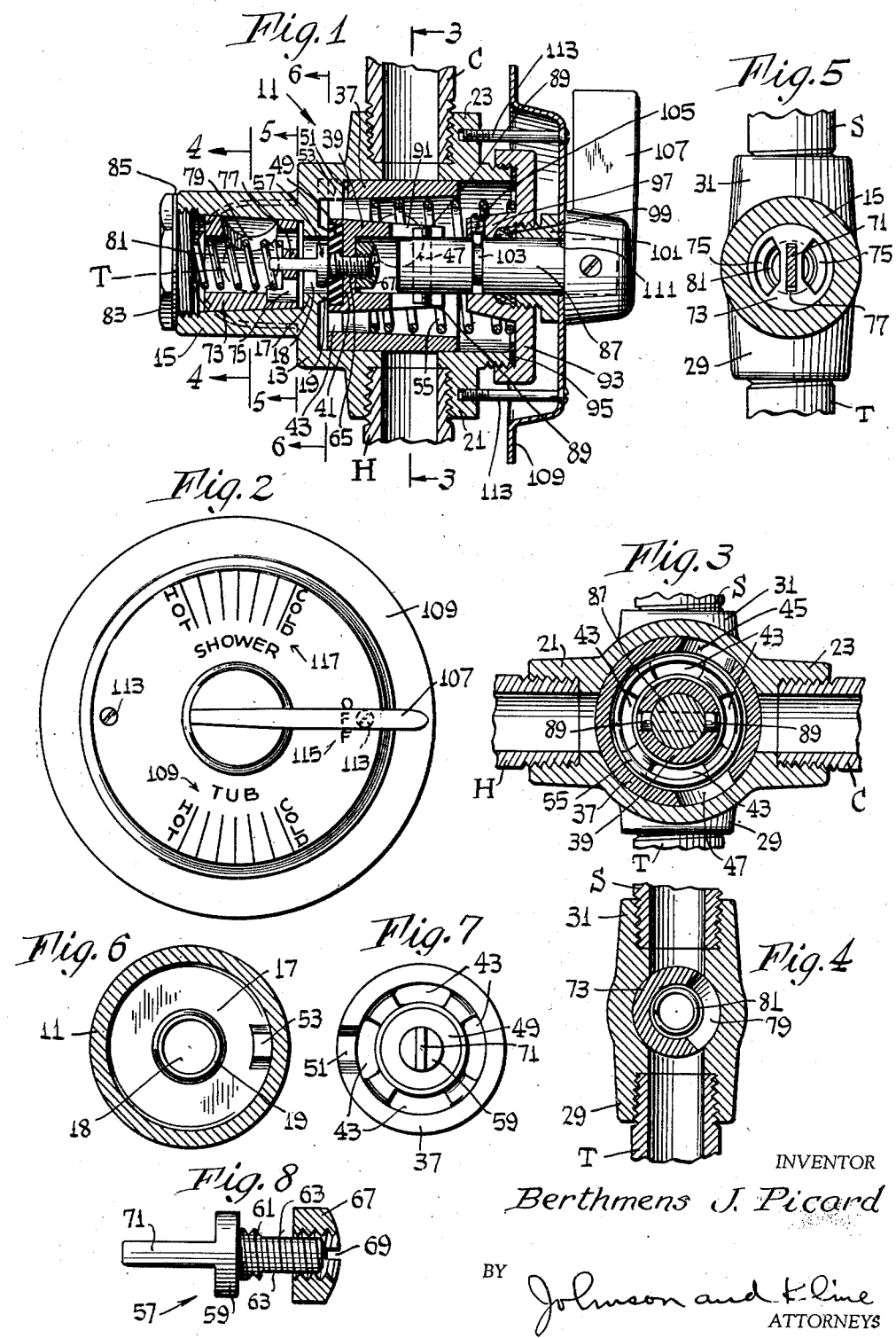

2,823,697

COMBINED MIXING AND DIVERTING VALVE

Berthmens J. Picard, Norwalk, Conn.

Application August 31, 1953, Serial No. 377,303

1 Claim. (Cl. 137—597)

This invention relates to fluid mixing valves and has for its object to provide a combined fluid mixing device, shut-off valve, and diverter in which all functions can be controlled by a single manual operating member. Another object of the invention is to provide a combined fluid mixing device, shut-off valve, and diverter in which all functions can be controlled by a single manual operating member whose control movement is substantially rotary.

It is still another object of the invention to provide a fluid mixing, shut-off, and diverting device having a single operating member in which a definite, reliable shut-off action is obtained in the "off" position.

A further object of the invention is the provision of a combined mixing valve and diverter having a single operating member in which movement of the operating member from off position in one direction sends the flow to one outlet, movement of the operating member from "off" position in the other direction sends the flow to the other outlet, and the degree of movement in either direction determines the proportioning of the mixed fluids at the selected outlet.

A further object of the invention is the provision of a combined mixing valve and diverter having a single operating member in which movement of the operating member from "off" position in one direction sends the flow to one outlet, movement of the operating member from "off" position in the other direction sends the flow to the other outlet, and positioning of the operating member in intermediate position provides a positive shut-off action.

A still further object of the invention is the provision of a combined mixing and diverter valve having a single shut-off washer so arranged that the washer can be as readily replaced as in a conventional faucet.

Additional objects, features and advantages will hereinafter appear.

In the accompanying drawing:

Figure 1 is a longitudinal section of a fluid mixing, diverting and shut-off valve according to the present invention.

Fig. 2 is a right hand end view of the device of Fig. 1.

Fig. 3 is a section taken on line 3—3 of Fig. 1.

Fig. 4 is a section taken on line 4—4 of Fig. 1.

Fig. 5 is a section taken on line 5—5 of Fig. 1.

Fig. 6 is a section taken on line 6—6 of Fig. 1 with the mixing element removed.

Fig. 7 is a left end view of the mixing element looking towards the right in Fig. 1.

Fig. 8 is a detail elevation partly in section of a special combined washer fastener and drive connection shown in assembled position in Fig. 1.

Referring to the drawing, the fluid mixing device of the present invention is represented in the form of a valve for bathing use designed to mix hot and cold water in the desired proportions and divert the mixture either to the bathtub faucet or to a shower head. The valve includes a valve body casting 11 which has a larger or mixing end 13 and a smaller distributing or diverting end 15 each of which is hollow. A central interior web 17 between the ends is formed to provide an opening 18 surrounded by a shut-off valve seat 19. Apertured bosses 21 and 23 on the mixing end provide for connection with hot and cold water supply lines H and C respectively, while apertured bosses 29 and 31 on the diverter end provide for connection with tub and shower lines T and S respectively.

The moving parts of the device, now about to be described, are shown throughout the several views in their "off" position.

Within the mixing end 13 of the casting 11 is a rotatable mixing valve element 37 which is cup-shaped and which has an interior hollow stem 39. The base of the cup is provided with a recess 41 surrounded by a plurality of openings 43. The wall of the cup-shaped element 37 is cylindrical and fits snugly but rotatably within the interior of the mixing section 13 whose inner surface also has a complementary cylindrical surface.

A pair of ports 45, 47 are formed in the wall of the cup-shaped element 37 and are positioned so as to make connection with the hot and cold water lines H and C at desired times and to desired degrees. In the arrangement shown the hot and cold water lines H and C are spaced 180 degrees apart, and the ports 45 and 47 about 130 degrees apart, and about 65 degrees on either side of the cold water line C when the valve element 37 is in "off" position. While this is deemed the simplest and most convenient arrangement, it will be understood that other angular relationships of the ports 45, 47 using a widened hot water inlet opening in the wall of portion 13 may be resorted to if desired, consistent with the type of operation hereinafter described. The ports 45, 47 are so located that as the valve member 37 is rotated in one direction, i. e., clockwise in Fig. 3, port 45 will first make full direct connection with cold water line C just before port 47 makes any substantial connection with hot water line H, and port 47 will make full direct connection with hot water line H just as port 45 passes out of connection with and shuts off cold water line C. When the valve member 37 is rotated in the opposite or anticlockwise direction from its "off" position, the same type of action occurs except that the relationship of the ports 45 and 47 is reversed.

The effect of ports 45 and 47, when they are aligned with the hot or cold water line openings in the casting 11 is to permit water from said lines to enter the interior of the cup 37 where it has access to the openings 43 at the bottom of the cup and may, under certain conditions, pass through the same.

The valve member 37, in addition to its mixing operation, just described, also performs a shut-off function. As previously mentioned the bottom of the cup 37 has a recess 41 which is designed to carry a shut-off or sealing washer 49 of resilient material, such as natural or synthetic rubber, similar to the usual faucet washer. The washer 49 cooperates with the valve seat 19 and acts to permit or prevent passage of water from the mixing portion 13 to the distributing portion 15 via the opening 18. To control this function the cup-shaped valve member 37 is provided at its bottom periphery with a notch 51 which cooperates with a cam projection 53 formed on the interior of the casting 11. Either or preferably, as shown, both of these have sloping faces whereby rotation of the valve member 37 will result in limited axial movement thereof to lift the washer 49 from seat 19, and the remainder of the cup periphery is substantially in a plane so that the washer 49 will be held spaced from the seat except when the notch 51 and projection 53 are aligned or nearly so. The notch 51 and projection 53 are located to provide a suitable "off" position for the valve member 37, and are preferably located so as to be nested when the valve member 37 is in the Fig. 3 position. A spring 55 fits inside the cup 37 and urges the same to the left in Fig. 1 so as to bring the washer 49 firmly up against the seat 19 whenever the notch 51 and projection 53 are aligned. Notch 51 is deep enough, as seen in Fig. 1, so that the washer 49 will rest firmly against the seat 19 and be pressed firmly thereagainst by spring 55 before the projection 53 engages the deepest part of notch 51.

Because of the slight axial movement of valve member 37, it is preferred that ports 45 and 47 be formed so that cam projection 53 must be completely removed from recess 51 before port 45 or 47 can line up with water line C or H.

Means is provided for maintaining the washer 49 in place and is preferably a special fastener as shown in the drawing in the form of a combined washer screw and drive connector means 57 seen in Fig. 1 and shown in detail in Fig. 8. The means 57 comprises a head 59 for retaining the washer 49 in its recess 41, and a threaded shank 61. The shank 61 has opposite flats 63 which give it a noncircular driving connection with a corresponding opening 65 in the center of the base of cup 37. A nut 67 is threaded on the shank 61 within the cup 37 (and also within the hollow stem 39 of the cup) to retain the parts in place, the nut preferably being provided with a kerf 69 or other facially engageable drive means for ready manipulation of the parts in restricted quarters. Extending from the head 59 and through the opening 18 is a noncircular drive element 71 whose purpose will hereinafter appear.

The diverter end 15 of the casting 11 preferably has its interior surface slightly tapered for engagement with the wall of a complementary hollow, tapered, cup-shaped plug valve 73, the bottom of the cup being apertured as indicated by reference characters 75 for fluid passage, and having a drive opening 77 shaped to receive slidably the noncircular drive element 71. A port 79 in the wall of the cup is arranged to connect the interior of the cup 73 with either the shower line S or the tub line T depending upon which direction the cup 73 is rotated. A spring 81 inside the cup urges the same into intimate contact with the interior surface of the diverter portion 15 so as to prevent leakage of fluid past the plug and insure passage of the fluid to whichever of the lines S or T is directly connected with the port 79. A cap screw 83 provided with a gasket 85 close and seal the diverter section 15, and also the interior end of the screw provides a perch for the outer end of spring 81 to keep the same compressed.

It will be apparent from the foregoing description that valves 37 and 73, although having a slight relative axial movement due to the action of notch 51 and cam 53, rotate in unison, and their rotation is brought about by a control shaft 87 which fits within the hollow stem 39 and has radial projections 89 slidable within drive slots 91 formed in the walls of said stem. Closing the mixing end 13 of the casting 11 is a threaded cap 93 having a sealing gasket 95 and provided with a central gland 97 which rotatably supports the shaft 87. Packing 99 and gland nut 101 prevent leakage around the shaft 87. The shaft preferably is peripherally grooved as shown at 103 to receive a lock screw 105 for determining its axial position. A combined operating handle and indicator 107 is affixed to the exposed end of shaft 87 and is used to control the operation of the mechanism. As seen in Fig. 1, the cap 93 also serves to retain and compress the shut-off spring 55.

An indicia-carrying wall plate 109 has a central opening 111 for the passage of shaft 87 and is mounted against the surface of the wall within which the device of this invention is placed. It is preferably supported nonrotatably by having spaced screws 113 passing through the plate 109 and threaded into portions of the casting 11.

Suitable indicia 115 is provided on the plate 109 to show the "off" position of the indicator 107. Other indicia 117 shows the range of "cold" to "hot" positions within the shower range. Similar indicia 119 is also provided for showing where the indicator should be set for the range of tub settings from "cold" to "hot."

In using the device of the present invention, the lines H, C, T and S are connected as shown, and water pressure is provided in the lines H and C. When the handle 107 is in the "off" position shown, flow of water to either of lines T or S is prevented in part by the valve 37 (which is seen in its "off" position in Fig. 3) but primarily by the seating of washer 49 against seat 19 due to the pressure of spring 55.

To direct water to the shower head the handle 107 is moved upwardly (anticlockwise) in Fig. 2. The first increment of movement, possibly 20 degrees causes the cam 53 to move the valve body 37 a small distance against the force of spring 55 (to the right as seen in Fig. 1) thus moving the washer 49 away from seat 19. As the handle comes opposite the line marked "cold," cold water is admitted through port 47 to the interior of cup 37, through openings 43 and passage 18 into the diverter portion, and through openings 75 into the interior of diverter valve member 73. The rotation of the mixing valve member 37 has also, through the connection 57, rotated the valve member 73 to a new position such that a portion of port 79 is now aligned with the line S, whereby the cold water escapes to the shower head. As further anticlockwise movement of the handle 107 occurs ports 47 and 45 move across the openings to lines H and C in such manner that less cold and more hot water is admitted to the interior of the valve member 37, until when the handle reaches "hot" position the port 47 has passed the opening of line C which is accordingly substantially closed off, and port 45 is lined up directly with line H. The size of the port 79 in diverter valve 73 is such that it communicates fully with the line S in all handle positions between "cold" and "hot." When the handle 107 is returned to "off" position the notch 51 again nests with the cam 53 allowing the spring 55 to move the valve member 37 to the left so that washer 49 closes against the seat 19 and cuts off all flow to the diverter section.

When the handle 107 is moved downwardly (clockwise) from the position shown in Fig. 2, the same series of operation occurs, except that the relationship of the ports 45 and 47 with respect to the lines H and C is reversed, and the port 79 in the mixing valve member 73 turns the flow into the line T which carries it to the tub spout, carrying the desired mixture (as determined by the setting of handle 107 between "cold" and "hot") into the bath tub.

When the washer 49 is worn to a point requiring replacement, it is necessary merely to remove handle 107, release plate 109 by removing screws 113, unscrew cap 93 and remove it together with shaft 87. Thereupon the spring 55 and valve member 37 can be lifted out. Nut 67 can then be loosened to permit the head 59 to be withdrawn and the washer 49 can be replaced by a conventional faucet washer. Reassembly is then effected by a reversal of the steps recited above.

From the foregoing description, taken with the accompanying drawing, it can be seen that the present invention provides a combined mixing valve, shut-off, and diverter operable by a single control element which is merely rotated in one direction or another. Furthermore this simplicity of operation is obtained without complicating the structure and, in fact, under conditions providing a structure significantly simpler and less costly to manufacture than that of most mixing valves whether combined with a diverter or not. It is further apparent that the valve which forms the present invention can be readily disassembled by unskilled persons when necessary to change washers, and that rehabilitation can normally be effected by the replacement of a single inexpensive washer of conventional faucet type.

Variations and modifications may be made within the scope of the claims and portions of the improvements may be used without others.

I claim:

A fluid flow control valve comprising a housing including a mixing chamber having a plurality of inlet ports and a connected coaxial diverter chamber supplied with fluid from said mixing chamber and having a plurality of discharge ports; a rotary mixing valve in said mixing chamber for determining the proportioning of fluids admitted from said inlet ports and permitting their mixture; a partition between said chambers having an aperture defined by a shut-off valve seat; a resilient disk on said mixing valve cooperable with said seat for controlling the flow of fluid from the mixing chamber to the diverter chamber, said mixing valve being axially movable in its chamber to move said disk towards and away from said seat; a rotary diverter valve in said diverter chamber, coaxial with said mixing valve for selecting a particular discharge port to dispense the mixture; connection means between said mixing valve and diverter valve passing through said aperture and constraining said valves to rotate in concert having a tongue and slot engagement permitting relative axial sliding of said valves; and cam means on said housing displacing said mixing valve axially in response to rotation thereof.

References Cited in the file of this patent

UNITED STATES PATENTS

| | | |
|---|---|---|
| 839,494 | Manning | Dec. 25, 1906 |
| 1,126,478 | Joyce | Jan. 26, 1915 |
| 1,479,544 | Johnson | Jan. 1, 1924 |
| 1,693,758 | Hennessey | Dec. 4, 1928 |
| 1,789,473 | Oelerich | Jan. 20, 1931 |
| 1,886,889 | Krupp | Nov. 8, 1932 |
| 2,676,615 | Symmons | Apr. 27, 1954 |
| 2,766,771 | Wenzel | Oct. 16, 1956 |